United States Patent [19]

Reh et al.

[11] 4,076,796

[45] Feb. 28, 1978

[54] CARRYING OUT ENDOTHERMIC PROCESSES IN FAST FLUIDIZED REACTOR WITH CONVENTIONALLY FLUIDIZED HOLDING REACTOR

[75] Inventors: Lothar Reh, Bergen-Enkheim; Hans-Werner Schmidt, Frankfurt am Main; Ludolf Plass, Kronberg, all of Germany

[73] Assignee: Metallgesellschaft Aktiengesellschaft, Frankfurt am Main, Germany

[21] Appl. No.: 690,525

[22] Filed: May 27, 1976

[30] Foreign Application Priority Data

Jun. 3, 1975 Germany .............................. 2524540

[51] Int. Cl.$^2$ ................................................ B01J 8/26
[52] U.S. Cl. .................................. 423/659; 423/177; 423/632; 423/625; 423/637; 34/10; 23/277 R; 23/262; 23/284; 423/DIG. 6; 423/DIG. 16
[58] Field of Search .................................... 423/74, 659, 423/659 F, DIG. 6, DIG. 16; 432/15, 16, 17, 58; 165/104 R, 104 F; 34/10, 11

[56] References Cited

U.S. PATENT DOCUMENTS

| 3,144,303 | 8/1964 | Engelmann ............................ 423/74 |
| 3,579,616 | 5/1971 | Reh et al. ................................ 34/10 |
| 3,648,380 | 3/1972 | Guilloud ................................. 34/10 |
| 3,836,635 | 9/1974 | Reh et al. ......................... 423/659 F |

OTHER PUBLICATIONS

Reh, L. "Fluidized Bed Processing", *Chemical Engineering Progress*, vol. 67, No. 2, (Feb. 1971), pp. 58–63.

*Primary Examiner*—O. R. Vertiz
*Assistant Examiner*—Brian E. Hearn
*Attorney, Agent, or Firm*—Karl F. Ross

[57] ABSTRACT

Endothermic processes are carried out in a fluidized-bed reactor which is connected to a holding reactor, solids being recirculated between the two reactors. The primary fluidized-bed reactor uses a fast-fluidized bed system in which the solids concentration decreases continuously from the bottom to the top of the reactor. After the necessary residence time in the holding reactor, solids are discharged. Solids are entrained with the gas stream from the primary reactor and are separated therefrom to be delivered to the holding reactor. The reaction is controlled by regulating the rate of recirculation of solids from the holding reactor to the fast fluidized bed reactor.

11 Claims, 3 Drawing Figures

CARRYING OUT ENDOTHERMIC PROCESSES IN FAST FLUIDIZED REACTOR WITH CONVENTIONALLY FLUIDIZED HOLDING REACTOR

FIELD OF THE INVENTION

The present invention relates to a method of carrying out endothermic processes using fluidized-bed techniques and, more particularly, to improvements in fluidized-bed reactor systems in which direct heat exchange between solids and gases can be effected.

BACKGROUND OF THE INVENTION

Fluidized-bed reactors are useful in a large number of applications in the chemical-process and heat-exchange fields and commonly owned prior U.S. Pat. Nos. 3,565,408 and 3,579,616 disclose various processes which can make use of heat-exchange and reactor capabilities of a fluidized bed.

Endothermic processes can be carried out in an orthodox or conventional fluidized bed, which is definable as a fluidized bed having a discontinuity in the solids gradient within the reactor or a well-defined separation between a gas zone above the bed and the particle-containing bed itself.

In the orthodox fluid bed, fluidization is carried out from below the particle layer so that the particles move within a bed or zone having upper and lower boundaries, the dense phase of the fluidized bed being separated from an overlying gas or dust space by a boundary layer having a high density gradient or a discontinuous density gradient. Orthodox fluidized beds of this type are described in British Pat. No. 878,827 and U.S. Pat. No. 2,799,558, for example.

Endothermic processes may also use a co-called "expanded" or "fast" fluidized bed which generally has no sharp density gradient separating a high-density particle phase from a lower-density gas phase.

In the fast fluidized bed, fluidization is carried out so that there is no well-defined upper boundary layer. In other words, solids density (solid volume or mass per unit of reactor volume) gradually diminishes from the bottom of the bed toward the top thereof. In order to achieve a fast expanded fluidized bed of this type, one supplies the fluidizing gas at a much higher velocity than is necessary to maintain the orthodox fluidized bed, the velocity being sufficient to enable the gas to entrain substantial portions of the solids of the bed out of the reactor. This of course would decrease the quantity of solids in the reactor and hence the solids content of the reactor must be replenished. The solids concentration or density (particles/unit volume or solid mass/unit volume) of an expanded or fast fluidized bed is thus less than the solids concentration of an orthodox fluidized bed but is greater than the solids concentration in the gas zone above the orthodox fluidized bed.

As described inter alia in the aforementioned commonly owned U.S. patents, in which some of us appear as inventors when fine-grained alumina hydrate is calcined, the gas velocity may correspond to a gas rate of 1500 to 3000 standard cubic meters per square meter of reactor cross section per hour ($Nm^3/m^2h$) and the density of the suspension may be maintained above 30 kilograms per cubic meter ($kg/m^3$) on the average throughout the top of the reaction zone and 100 to 300 $Kg/m^3$ at the lower part of the reaction zone.

The solids entrained with the gas are separated out in, for example, a cyclone-type separator and part of the solids may be recirculated into the fluidized bed while the remainder constitutes a desired product. For further background on this type of system, reference is made to German printed application (Auslegeschrift) No. 1,146,041.

In the production of alumina it is also known to use a fast fluidized bed in which solids are separated from the gas and are recycled to the fluidized bed to supply heat to the latter. At least part of the heat requirement is met by feeding hot gases into the fluidized bed in an enlarged portion of the shaft above the gas distributor and above the inlet for recycled solids. Reference is made, in this connection, to German Pat. No. 1,092,889.

All of these methods have undesirable heat-utilization characteristics.

Furthermore, in practice it is found to be difficult with these conventional systems to insure uniform combustion of the fuel without overheating. The problem is encountered both when the combustion takes place within or adjacent the fluidized-bed reactor and also when it takes place in a separate combustion chamber spaced from the reactor. For high-temperature processes, combustion of the fuel in a combustion chamber outside the fluidized-bed reactor makes it difficult to provide materials capable of withstanding the high combustion temperature in an economical or convenient manner.

An attempt to solve this problem has been made, as described in U.S. Pat. No. 3,579,616, by utilizing the waste heat of the exhaust gas and the entrained solids to thereby increase the utilization of fuel and achieve an optimum heat-consumption rate. The combustion was carried out in two stages, first in a high-density region only with fluidizing air in substoichiometric amounts, then in a subsequent stage in the presence of secondary air to achieve at least stoichiometric combustion (i.e. stoichiometric or slightly over-stoichiometric combustion).

An advantage of this system was the elimination of overheating of limited regions of the fluidized bed and the ability to maintain substantially constant temperature conditions and accurate temperature control. However, the system has been found to have a technological disadvantage. If long minimum residence time is required for the solids in certain reactions, the reactor must be increased considerably in height and the result is a considerable pressure loss as well as increased energy consumption in displacing the gas through the reactor.

It should be noted that other alternatives are equally unsatisfactory. For example, the decreased residence time means that the reaction does not reach completion or a sufficient degree of completion while greater bed densities can only be achieved with lower gas velocities and high pressure drop. For a given density of the suspension and pressure drop in the fluidized bed, therefore, there is a decreased rate of production and for an increased production rate the density of the suspension must be increased so that the pressure drop will also increase and high energy requirements are a result.

Furthermore, solutions which lead to greater circulation rates of the solids than is otherwise technologically required also lead to unnecessary energy consumption.

OBJECTS OF THE INVENTION

It is the principal object of the present invention to provide a method carrying out endothermic reactions in which the disadvantages of earlier systems are avoided and reactions can be effected in a highly economical and efficient manner in a fast fluidized-bed system in spite of the fact that high residence times or reaction times may be required.

Still another object of the invention is to provide a method of carrying out plural-stage reactions, especially those in which an endothermic first stage requiring a short reaction time is followed by a more prolonged second-stage process, without the disadvantages of the earlier systems mentioned above.

Yet another object of the invention is to provide a reactor system which preserves the advantages of fluidized-bed reaction systems while eliminating the disadvantages thereof and permitting the overall reaction to have relatively high reaction times with a minimum of capital and operating cost.

SUMMARY OF THE INVENTION

For the purposes of this invention, the present description and the claims herein, a reference to "endothermic reactions", while intended to be sufficiently broad as to include substantially all reactions requiring the input of thermal energy and capable of being carried out in a fluidized bed under the conditions described hereinbelow, should be understood to exclude the thermal decomposition of aluminum chlorohydrate followed by calcination of the aluminum oxide resulting therefrom. This exception is the subject of an independent disclosure since it involves factors not generally present in the other endothermic reactions to which the claimed system may be applied.

According to the invention an endothermic reaction is carried out in a fast or "expanded" fluidized bed and the gases effluent from the bed entrain solid particles of the bed with them. The solids are collected from the gas and are fed into a holding reactor, being fluidized therein by a low-velocity gas so that the holding reactor can be considered to operate as an orthodox fluidized bed replenished with solids separated from the effluent solids drawn from a fast (primary) fluidized bed and supplying, in turn, solids to the fast fluidized bed at a controlled rate.

The recycling of the solids from the bed of the holding reactor to the fast fluidized or primary reactor is controlled to maintain a predetermined density (number of particles per unit volume or solids mass per unit volume) in the fast fluidized-bed reactor. The solids recycled from the holding reactor to the expanded fluidized-bed reactor constitute a partial stream of the solids flow, another partial stream being withdrawn from the solids flow scheme, preferably from the holding reactor, and being introduced into a fluidized-bed cooler after a residence time in the system sufficient to complete the reaction. This essential feature of the invention, namely, control of the reaction by varying the rate of return of solids from the holding reactor to the fast or primary reactor, is carried out by varying the flow cross section of the passage between the overflow of the holding reactor and a low point of the primary reactor.

While it is known to provide a fluidized-bed reactor in combination with a separating system for recovering solids from the gases effluent from the fluidized bed, e.g. a cyclone, and to recycle solids from the cyclone to the fluidized bed or to branch solids elsewhere from the cyclone, it should be understood that the cyclone, to the extent that it performs a solids-separating function, cannot be considered an equivalent of the holding reactor constituting an essential component of the instant invention since the residence time of the solids in the cyclone is insignificant at most. Of course, storage bins and the like which may be provided between the cyclone and the fluidized bed are also incapable of being equated with a nonexpanded fluidized-bed holding reactor since they are incapable of maintaining reaction conditions for phase transformations and the like which may be necessary to complete the reaction.

Thus, the method according to the invention is carried out in a system which comprises, in addition to an expanded or fast fluidized-bed reactor, the aforementioned holding reactor which itself is fluidized with a fluidizing gas at a velocity less than that of the fluidized gas supplied to the primary reactor.

An extremely important aspect of the present invention resides in the fact that recirculation-rate control permits regulation of process parameters which heretofore have had to be adjusted separately with independent means (e.g. process controllers) if they could be regulated within the necessary limits at all.

Thus we have found, for example, that a substantially steady-state temperature (constant temperature) varying say within only ±20° C. can be maintained strictly by regulating the recycling rate and hence the solids-flow cross section in spite of a tendency toward temperature fluctuations of many times this value with conventional fluidized-bed systems because of changes in fuel and combustion characteristics, withdrawal of the product at varying rates etc.

Most endothermic reactions can be conceived as being carried out in several phases. For example, the initial phase may be a primary endothermic reaction, e.g. a thermal decomposition which is effected in the primary fluidized-bed reactor, i.e. the fast or expanded fludized bed. A second stage may be a phase transformation involving a partial or complete change of state, recrystallization or the like which is effected primarily in the holding or secondary reactor. Another typical stage for which the secondary reactor is particularly advantageous is a diffusion process whereby materials within the solids interdiffuse or materials diffuse into the solids from the ambient gas or out of the solids into the ambient gas.

These after-reactions generally require substantially less externally supplied heat than the energy supply to the primary reaction. In general, therefore, the heat supplied to the secondary or holding fluidized-bed reactor will be less than the heat supplied to the primary or expanded fluidized-bed reactor.

Particles having a mean particle size $dp_{50}$ in the range of, say 20 to 300 microns can be heated quickly and react rapidly because of the relatively high surface-area/mass ratio. In general, about 90% of the overall reaction is complete when these particles leave the fluidized-bed (primary) reactor for the first time. The remaining reaction is then carried out in the secondary or holding reactor. It has been found that this process is far more economical and leads to less deterioration of equipment than a process which attempts to carry out 100% of the reaction in a single fluidized-bed reactor.

The method according to the invention combines the possibility of an intense supply of heat in the primary fluidized-bed reactor with the advantages of a two-stage, mild combustion. The two-stage combustion may be controlled so that the resulting overall combustion is approximately stoichiometric. Such combustion is desirable if a substantially neutral reactor atmosphere is desired, e.g. for a dewatering or heat-treating process.

For a reducing process, the secondary air is supplied at such a rate that a more or less reducing atmosphere is formed. In this case, air, possibly preheated air, may be introduced to effect an afterburning of the exhaust gas from the reactor before the gas enters the suspension-type heat exchangers.

To avoid the disadvantages which are due to the above-mentioned residence-time requirements, the solids which have been collected from the gases are fed into the holding fluidized reactor and solids are recycled from the holding reactor only at the rate which is required to maintain the density of the suspension in the primary expanded fluidized-bed reactor and, if desired, to avoid appreciable temperature differences in the overall system consisting of the primary fluidized-bed reactor and the holding reactor.

It is important to note that the temperature-control technique described above is especially significant in this connection because it allows regulation of the flow cross section of the constriction between the overflow of the holding reactor and the primary reactor to maintain a substantially constant temperature in both in spite of the fact that they are independently fluidized and fueled.

The maintenance of a substantially constant pressure drop in the primary reactor, which can at least in part be obtained also by regulating the return of solids thereto and hence the solids density therein, has also been found to be of great importance.

The operating conditions in the primary fluidized-bed reactor and the recycling of solids from the holding reactor are controlled so that the resulting average density of the suspension in the zone between the grate and the secondary-air inlet of the primary fluidized-bed reactor corresponds to a solids volume of 2 to 20% of the reactor volume in the zone between the grate and the secondary-air inlet.

For solids having densities of 1.5 kg/l and 5 kg/l, this corresponds to a density of the suspension of 30 to 300 kg/m$^3$ and 100 to 1000 kg/m$^3$, respectively.

The density of the suspension above the secondary-air inlet should be controlled so that the solids volume amounts to 0.2 to 2% of the reactor volume. In the case of solids having the above-mentioned densities, this corresponds to densities of the suspension of 3 to 30 kg/m$^3$ and 10 to 100 kg/m$^3$, respectively. Under these conditions, the pressure loss in the fluidized-bed reactor is about 250 to 900 mm of water.

These operating conditions can be defined by the Froude's and Archimedes' numbers (Fr and Ar, respectively) in the following ranges:

$$0.1 < \tfrac{3}{4} \times Fr^2 \times \rho g/\rho k - \rho g) < 10$$

and $$0.1 < Ar < 100$$

where $$Ar = \frac{d_k^3 \times g \, (\rho k - \rho g)}{\rho g \times \nu^2}$$

and
  Fr = Froude's number
  Ar = Archimedes' number
  $\rho g$ = density of gas in kg/m$^3$
  $\rho k$ = density of solid particle in kg/m$^3$
  $d_k$ = diameter of spherical particle in m
  $\nu$ = kinematic viscosity in m$^2$/sec.
  $g$ = constant of gravitation in m/sec.$^2$.

In the holding reactor the fluidizing-gas velocity is low and should be just sufficient mainly to ensure thorough mixing of the solids. As a result, the density of the suspension is much higher. For the full utilization of the holding reactor, the density of the suspension therein should be such that the solids volume is above 35% of the volume occupied by the gas/solids-suspension. Where the above-mentioned densities are used, this corresponds to lower limits of 560 kg/m$^3$ and 1750 kg/m$^3$, resepectively, for the density of the suspension.

The definition of these conditions by Froude's and Archimedes'-numbers results in the same Archimedes' number range in the holding reactor as in the fluidized-bed reactor and in a Froude's number meeting the condition $$\tfrac{3}{4} \times Fr^2 \times \rho g/(\rho k - \rho g) < 5 \times 10^{-3}$$

The relative dimensions of the fluidized-bed reactor and the holding reactor will mainly depend on the mean total residence time required for a product of specified quality and on the heat-consumption rate of the endothermic process. For a given density of the suspension in the fast fluidized-bed reactor and a given fuel consumption per unit of time, the proportion of fresh solid will be decreased and the rate at which solids are withdrawn from the holding reactor will be increased in case of a higher heat requirement.

Conversely the proportion of the fresh solid will be increased and the rate at which solids are withdrawn from the holding reactor will be decreased with a lower heat requirement.

It will generally be desirable to provide for a mean solids residence time of 10–30 minutes in the primary fluidized-bed reactor and for a mean solids residence time in the holding reactor which is 2 to 10 times the mean solids residence time in the primary fluidized-bed reactor.

The mean residence time in the fluidized-bed system can be calculated from the sum of the mean densities of the suspensions in both reactors (fast fluidized-bed reactor and holding reactor) with respect to the product rate per hours. In this calculation the rate at which solids are recycled from the holding reactor is taken into account.

Additional control actions are made possible by the selection of the rates of fluidizing air and secondary air and particularly by the proportioning of both gas streams and by the selection of the level of the secondary-air inlet.

According to another preferred feature of the invention the secondary air is admitted on a level which corresponds to about 10 to 30% of the total height of the fluidized-bed reactor. The ratio of the rate at which secondary air is supplied to the fluidized-bed reactor to the rate at which fluidizing air is supplied thereto is controlled to be between 10:1 and 1:1.

If solids are to be recycled from the holding reactor only at a low rate, e.g. because the heat-consumption rate is low, but a relatively long total residence time is required, additional heat is supplied in the holding reactor by the direct introduction of fuel. In the latter system the solids circulation does not serve to completely compensate for the radiation loss of the holding reactor but is used only for fine adjustment of the temperature.

Whereas the holding reactor always accounts by itself for the main portion of the total solids residence time, it may also be used for additionally affecting the solids or for performing other reactions with the solids. For instance, inert gas rather than air may be used as fluidizing gas and/or chlorine or fluorine may be admitted for a partial chlorination or fluorination.

For a high heat economy of the method, the material to be processed is preheated and/or dewatered in a manner known per se with the exhaust gas from the fluidized-bed system, preferably in suspension-type heat exchangers.

Particularly if the feed is moist, the exhaust-gas temperature may be controlled. Thus a part of the material to be subjected to the endothermic process is directly fed to the primary fluidized-bed reactor and another part is used to extract heat from the exhaust-gas stream before being fed to the primary fluidized-bed reactor. The material can be proportioned so as to control the exhaust-gas temperature so that the latter is at an optimum for purification in a electrostatic precipitator or prevents condensation below the dewpoint.

To provide for a high heat economy, it is another preferred feature of the invention that the discharged stream of solids is cooled in a fluidized-bed cooler, which has preferably a plurality of cooling chambers which are traversed in succession. This fluidized-bed cooler may be used to preheat the secondary air and/or may be provided with additional cooling registers exposed to hot gas and solids in the chambers for a preheating of fluidizing air for the primary fluidized-bed reactor and/or the holding reactor.

Particularly in reducing processes in which a reoxidation of the reaction product is to be avoided, inert gas rather than air has to be used as the fluidizing gas in the fluidized-bed cooler. In this case, the inert gas is circulated through a heat exchanger, e.g. a Venturi-type scrubber, which is directly supplied with water and serves to cool and, if desired, to purify the inert gas. The cooling action may be intensified by spraying water into the fluidized-bed cooler.

Gas is supplied to the reactors at such rates that the gas flows in the primary fluidized-bed reactor at a velocity of 3 to 15 m/sec. (preferably 4 to 10 m/sec.), and in the holding reaction at a velocity of 0.1 to 0.3 m/sec., based on the empty reactors.

The operation temperatures can be varied within a wide range and depend on the requirements of the intended process. The temperatures may lie between a lower limit which is determined by the ignition temperature of the fuel and an upper limit of about 1500° C.

The method according to the invention has been found to be satisfactory for:

(1) Processes for dewatering crystalline inorganic compounds, such as hydroxides of magnesium iron or aluminum.

(2) Heat-treating processes, e.g. the burning of lime and dolomite, the deacidification of cement, and the decomposition or iron sulfate or magnesium sulfate; the decomposition processes can be carried out in a slightly reducing atmosphere.

(3) High-temperature metallurgical processes, e.g. the oxidation of ilmenite and reducing processes involving a long total reduction time.

Of great significance is the use of the above-described system for carrying out reactions which involve a phase transformation in the solid product obtained. It is known, for example, that various solids as produced by the above-described processes can be obtained in different phases, some of which are more desirable than others. For example, in the dewatering of aluminum hydroxide, the alumina product which is formed may have alpha and gamma phases. Alpha phase transformation, which is a time-consuming process, is thus carried out in the long residence-time holding reactor, following the initial step of heating and dewatering in the primary reactor.

BRIEF DESCRIPTION OF THE DRAWING

The above and other features of our invention will be explained more fully and by way of example with reference to the drawing and the specific Examples.

In the Drawing

SPECIFIC DESCRIPTION

Figure 1:
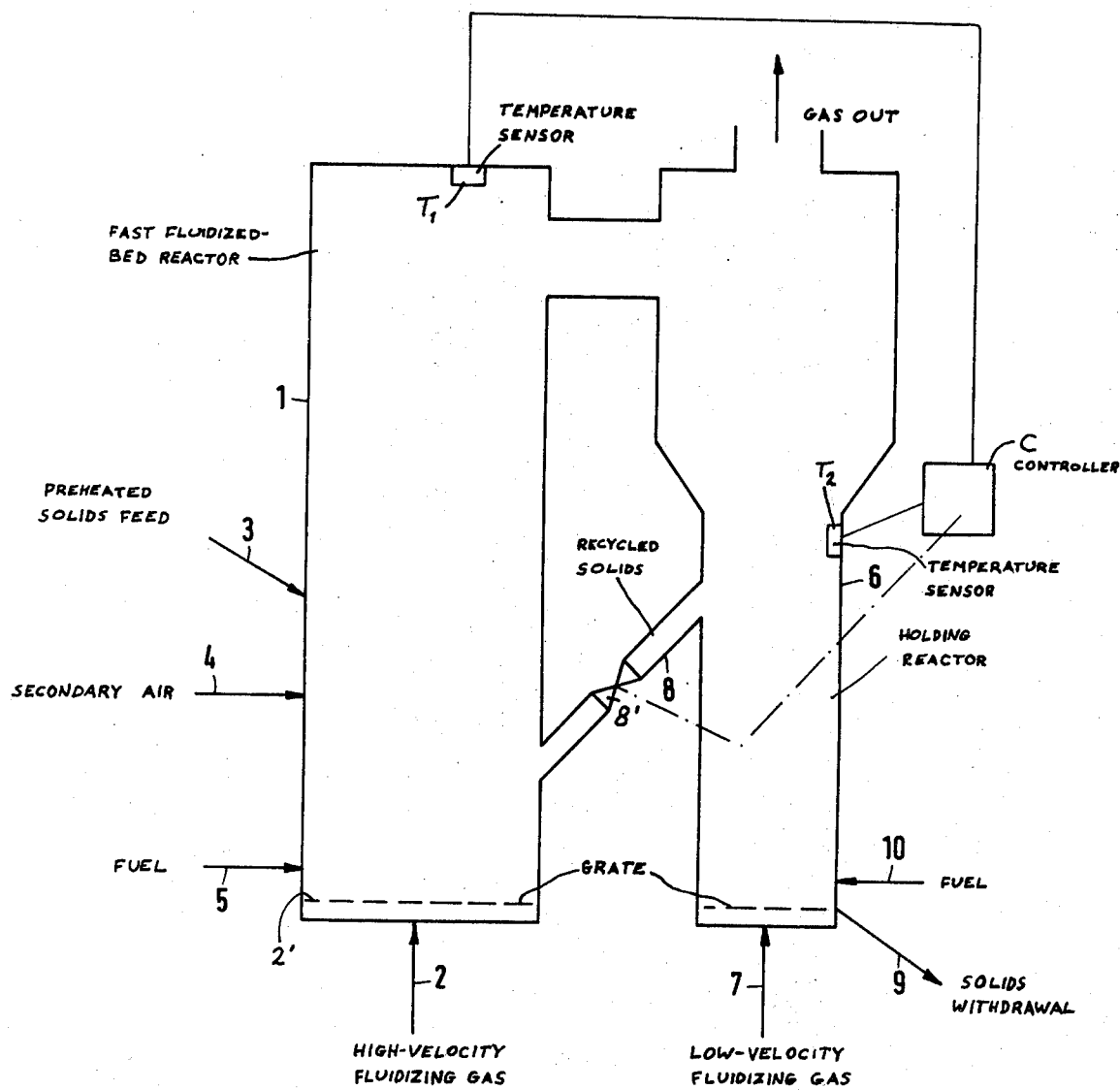
FIG. 1 is a diagrammatic view showing a fluidized-bed reactor and a holding reactor.

In the system shown in FIG. 1 a fluidized-bed reactor 1 is supplied with fluidized gas through conduit 2 (below gate 2') and with fresh or preheated feed through conduit 3. Secondary air is fed through supply conduit 4 and fuel through conduit 5.

The solids which are discharged from the fluidized-bed reactor 1 under the operating conditions are separated from the gas in the upper portion of the holding reactor 6 and then enter the lower portion, in which the solids are slightly fluidized by gas which is supplied through conduit 7. At a rate controlled by gate 8', solids are recycled through conduit 8 to the fluidized-bed reaction 1. Conduit 8 forms a descending passage between an overflow point of reactor 6 to a low point of reactor 1. Solids are withdrawn through discharge means 9 at the bottom of the reactor. A conduit 10 may be used to feed fuel to the holding reactor 6 for supplying additional heat thereto, if desired.

A temperature sensor $T_1$ in primary reactor 1 and a temperature sensor $T_2$ in the holding reactor 6 provided inputs to a controller C which operates the gate 8' to regulate the cross section thereof and maintain the condition $T_1 \approx T_2 = T \pm 20°$ C wherein T is the desired reaction temperature.

Conduit 8 defines the top of the fluid bed in the holding reactor 6 and is constituted as an overflow discharge path therefrom.

Figure 2:
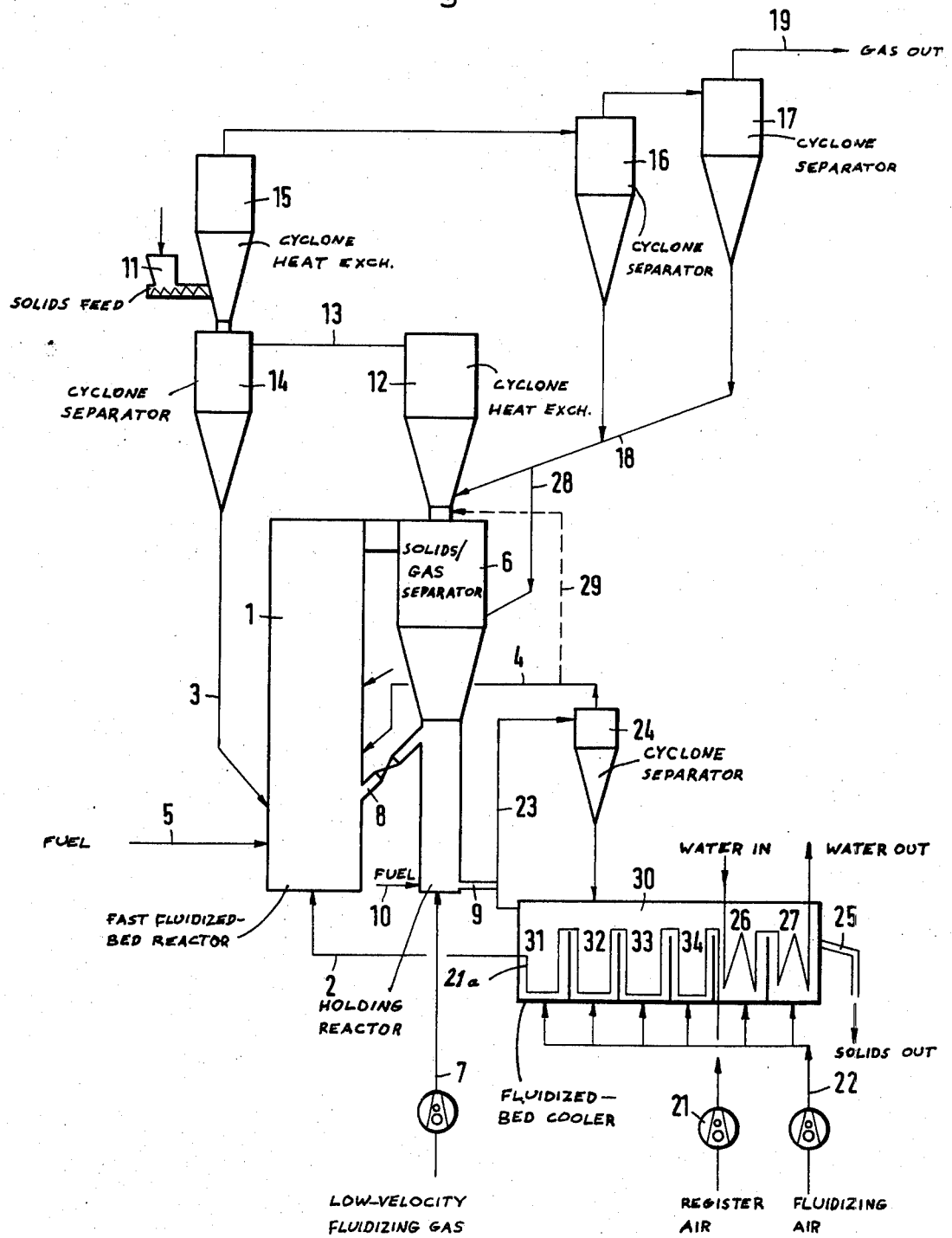
FIG. 2 is a flow scheme which represents a preferred embodiment of the method according to our invention providing for a cooling of the exhaust gas and solids.

In the flow scheme shown in FIG. 2, fresh solids are fed through a metering feeder 11 to a suspension-type exchanger system, which is fed with exhaust gases mainly from the fluidized-bed reactor 1. The solids first enter the second suspension-type heat exchanger 15 in the gas flow path and owing to the high velocity of flow are entrained by the gas. In the separators 16 and 17 the solids are separated from the gas and are then fed through conduit 18 to the first suspension-type exchanger 12 in the gas flow path. Solids are again entrained through conduit 13 and are separated in the separator 14 and are then fed through conduit 3 into the fluidized-bed reactor. The exhaust gas leaving from the solids separator 17 is fed through conduit 19 to gas-purifying means, which are not shown.

In the fluidized-bed reactor 1, the solids are fluidized to form a relatively dense suspension in the zone between the fluidizing-air inlet 2 and the secondary-air inlet 4. The suspension has a lower density above the secondary-air conduit 4. The solids discharged by the gases are separated in the holding reactor 6 and are maintained in a slightly fluidized state by low-velocity gas fed through conduit 7. A partial stream of solids is recycled at a controlled rate through conduit 8 into the fluidized-bed reactor 1.

Another partial stream of solids is fed through the discharge means 9 and gas conduit 23 and cyclone 24 to a fluidized-bed cooler 30. The fluidized-bed cooler 30 comprises cooling chambers 31, 32, 33 and 34.

An immersing-cooling register 12a supplied with air from blower 21 extends through said cooling chambers. Fluidizing air is supplied through conduit 22 and is collected in conduit 23. Most of the solids are separated from the used fluidizing air in cyclone 24, and the used fluidizing air is then fed through conduit 4 as secondary air into the fluidized-bed reactor 1. The air which has flown through the cooling register 21 is fed through conduit 2 as fluidizing air into the fluidized-bed reactor 1. The cooled solids are subjected to indirect aftercooling in two water-cooled chambers 26 and 27 and are then discharged through conduit 25.

In a modification of the method, part of the air which leaves the cyclone 24 is added through conduit 29 to the gas which leaves the holding reactor 6 and in which the added air is used, e.g., to afterburn reducing constituents. Part of the solids collected in separators 16 and 17 can bypass the first suspension-type exchanger 12 in the gas flow path and can be fed through conduit 28 directly to the fluidized-bed reactor 1.

Figure 3:
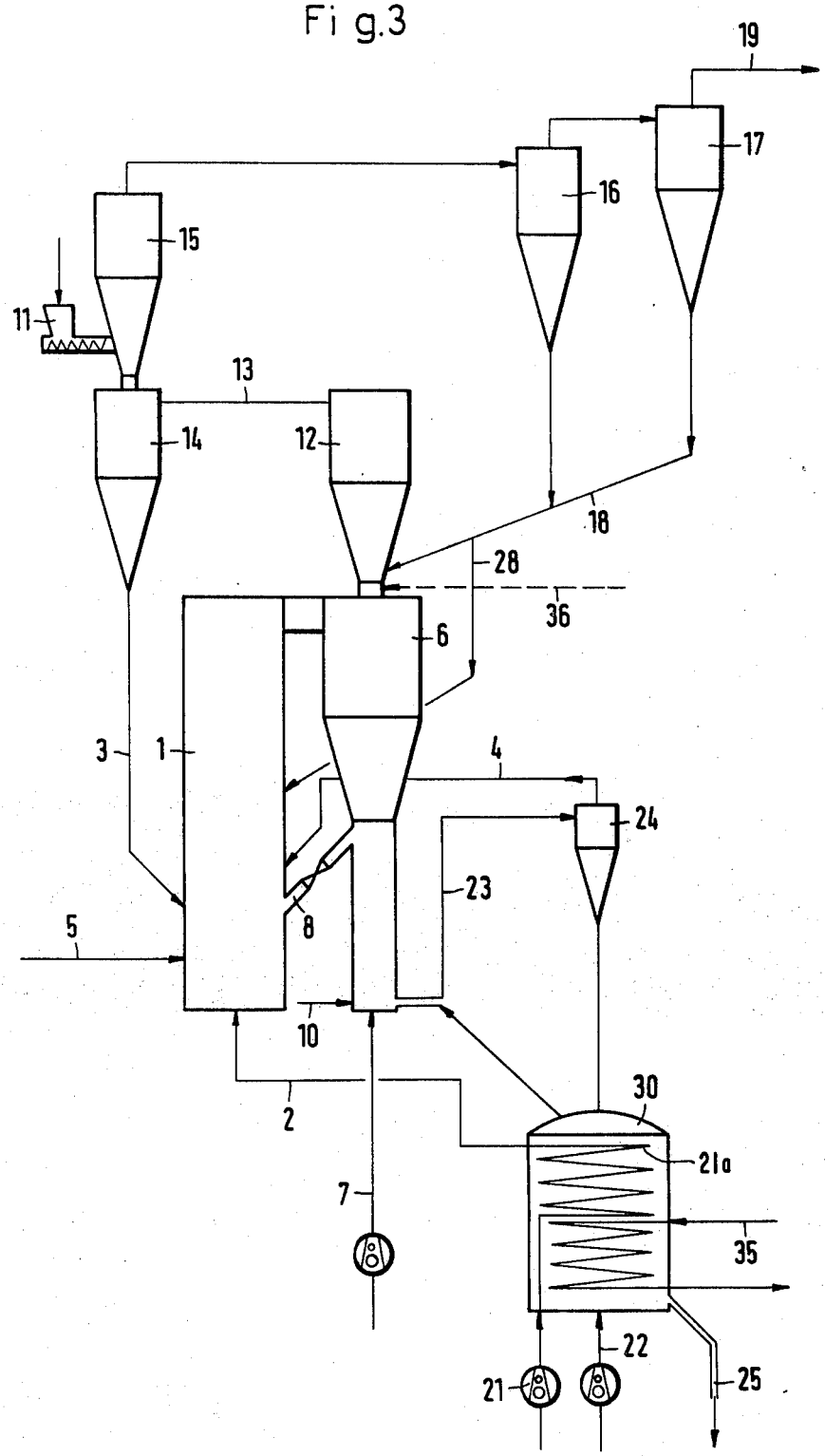
FIG. 3 is a flow scheme showing a preferred embodiment of the method according to our invention providing for the use of a reducing atmosphere.

The system shown in FIG. 3 has been designed specifically for reducing processes. The fluidized-bed cooler 30 is modified from the fluidized-bed cooler 30 of FIG. 2 in that there is only one cooling chamber, which contains a cooling register 21a for peheating air, which is to be fed as fluidizing air to the fluidized-bed reactor 1, and a cooling register 35, which is supplied with water that is to be converted into steam.

In reducing processes in which a reoxidation of the product must be avoided, the fluidized-bed cooler 30 may be replaced by a cyclone cooler with a water-cooled gas cycle only an indirectly and/or directly cooled drum cooler,.

A further modification from the flow scheme of FIG. 2 resides in that cold air is fed through a separate conduit 36 rather than the conduit 29 of FIG. 2.

SPECIFIC EXAMPLES

Example 1 (with reference to FIG. 2)

Drying and Calcining Filter-Moist Aluminum Hydroxide

The process is carried out with the aid of a fluidized-bed reactor 1 which is 2.15 m in inside diameter and has an inside height of 12 meters. Secondary air is admitted on a level which is 2.5 meters above the gas distributor. Fuel oil is admitted on a level which is 0.4 m above the gas distributor.

The holding reactor 6 has an inside height of 7 m and in its lower portion, below the recycle outlet 8, is 1.6 m in inside diameter.

The fluidized-bed cooler 30 has six chambers, four of which (31–34) are air-cooled whereas two chambers (26 and 27) are indirectly cooled with water.

At a rate of 18.2 metric tons per hour, filter-moist aluminum hydroxide (12% adherent moisture) is fed through metering feeder 11 to the suspension-type exchanger 15. The exhaust gas from the solids separator 14 is at a temperature of 400° C. A gas-solids suspension at 130° C enters the separators 16 and 17. The exhaust gas is conducted through conduit 19. The solids are fed through conduit 18 into the suspension-type exchanger 12 in which the solids and the gas, which leaves the reactor system at 1100° C, are mixed to a suspension. The resulting suspension is at 400° C and flows through conduit 13 into the separator 14, from which solids are fed through conduit 3 to the fluidized-bed reactor 1. At this point the solids amount to about 11.5 metric tons per hour (ignition loss = 10%).

The fluidized-bed reactor 1 is fed with fluidizing air at a rate of 3600 standard m$^3$/h through the gas-distributing bottom and is fed with secondary air at a rate of 7100 standard m$^3$/h and through conduit 5 with heavy fuel oil at a rate of 860 kg/h. Before being fed to the fluidized-bed cooler, the fluidizing air is preheated to 620° C and the secondary air to 700° C in the fluidized-bed cooler 30. A two-stage combustion in the fluidized-bed reactor 1 results in a temperature of 1100° C.

The suspension has a density of about 250 kg/m$^3$ in the region between the gas-distributing bottom and the secondary-air inlet 4 and of about 20 kg/m$^3$ above the secondary air inlet 4. The resulting gas velocity, based on the empty reactor, is about 5 m/sec. in this case.

The solids entrained by the gases leaving the fluidized-bed reactor 1 are separated in the top portion of the holding reactor 6 and are collected in the lower portion. The residencetime reactor 6 is fed with unpreheated fluidizing air at a rate of 180 standard m$^3$/h.

At a rate of 10.2 metric tons, alumina at a temperature of 1100° C is discharged through means 9 and is fed through conduit 23 and cyclone 24 into the fluidized-bed cooler 30. Fluidizing air at a rate of 7100 standard m$^3$/h is supplied to the fluidized-bed cooler 30 and is heated therein to an end temperature of 700° C. Air at a rate of 3600 standard m$^3$/h is conducted through the cooling register 21 and is heated therein at 620° C. The alumina is finally cooled in the cooling chambers 26 and 27 with circulated cooling water and is discharged through conduit 25 at a temperature of 8° C.

The total residence time in the reactor system 1/6 is 1.5 hours and is shared by the fluidized-bed reactor 1 and the holding reactor 6 in a proportion of 1:3.3.

The alumina product had the following particle-size distribution:

12% > 90 μm
48% > 63 μm
75% > 44 μm
92% > 25 μm.

Note that the temperature in both reactors is maintained at about 1100° C ± 20° C by minor variation in the flow cross section of duct 8. A phase transformation is effected in the holding reactor and the product is very uniform. Overheating in either reactor, which would be irreversible and produce a nonhomogeneous multiphase product, is completely avoided.

Example 2 (with reference to FIG. 2)

Calcination of Dolomite to CaO.MgO

The process is carried out by means of a fluidized-bed reactor 1 which is 2 m in inside diameter and has an inside height of 15 m. Secondary air is admitted on a level which is 3 m over the gas distributor. Fuel oil is admitted on a level which is 0.5 m above the gas distributor.

The holding reactor 6 has an inside height of 5.5 m and is 1.4 m in inside diameter in its lower portion disposed below the recycle outlet 8.

The fluidized-bed cooler 30 has six chambers, four of which (31-34) are air-cooled whereas two chambers (26 and 27) are indirectly cooled with water.

At a rate of 24 metric tons per hour, dolomite is fed through metering feeder 11 to the suspension-type exchanger 15. The gas leaving the solids separator 14 is at a temperature of 500° C. The gas-solids suspension entering the separators 16 and 17 is at a temperature of 200° C. The exhaust gas is conducted through conduit 19. The solids are fed through conduit 18 into the suspension-type exchanger 12, where they are mixed with the gas which leaves the reactor system at 950° C. The resulting suspension is at 500° C and flows through conduit 13 into the separator 14, from which solids are fed through conduit 3 to the fluidized-bed reactor 1.

The fluidized-bed reactor 1 is supplied with fluidizing air at a rate of 4000 standard m$^3$/h through the gas-distributing bottom and with secondary air at a rate of 9340 standard m$^3$/h and through the conduit 5 with heavy fuel oil at a rate of 1080 kg/h. The fluidizing air is preheated to 650° C and the secondary air to 700° C in the fluidized-bed cooler 30. A combustion in two stages results in a temperature of 950° C.

The suspension has a density of about 250 kg/m$^3$ in the region between the gas-distributing bottom and the secondary-air inlet 4 and of about 20 kg/m$^2$ above the secondary-air inlet 4. Based on the empty reactor, the resulting gas velocity is about 6.9 m/sec. in this case.

The solids entrained by the exhaust gases from the fluidized-bed reactor 1 are separated in the upper portion of the holding reactor 6 and are collected in its lower portion. The holding reactor 6 is supplied with unpreheated fluidizing air at a rate of 186 standard m$^3$h so that a gas velocity of 0.15 m/sec. results. The mean density of the suspension is 1000 kg/m$^3$.

At a rate of 12.5 metric tons per hour, calcine at 950° C is discharged through discharge means 9 and is fed through conduit 23 and cyclone 24 into the fluidized-bed cooler 30, to which fluidizing air is supplied at a rate of 9340 standard m$^3$/h and is heated therein to an end temperature of 700° C. Air at a rate of 4000 standard m$^3$/h is conducted through the cooling register 21 and is heated therein to 650° C. The calcine is cooled in the cooling chambers 26 and 27, with circulated cooling water and is discharged through conduit 25 at a temperature of 100° C.

The total residence time in the reactor system 1/6 amounts to 1.0 hour and is shared by the fluidized-bed reactor 1 and the residence-time reactor 6 in a proportion of 1:2.

Example 3 (with reference to FIG. 3)

Reduction of Hematite to Magnetite

The process is carried out with the aid of a fluidized-bed reactor 1 which is 1.0 m in inside diameter and has an inside height of 18 m. Secondary air is admitted on a level which is 3.0 m above the gas distributor and fuel oil on a level which is 0.4 m above the gas distributor.

The holdng reactor 6 is 1.0 m in inside diameter in its lower portion, below the recycle outlet 8, and has an inside height of 5 m.

The fluidized-bed cooler 30 has a chamber which contains a cooling register 21a that is supplied with air and a cooling register 35 that is supplied with water.

At a rate of 20 metric tons per hours, laterite ore is fed through metering feeder 11 to the suspension-type exchanger 15. The ore has a mean particle diameter of about 60 μm and the following chemical analysis:

52.6% — $Fe_{total}$
0.17% — $Fe^{2+}$
9% — $SiO_2$
7.1% — $Al_2O_3$
8.7% — Ignition loss.

The gas leaving the solids separator 14 is at 390° C. The gas-solids suspension entering the separators 16 and 17 is at 150° C. The exhaust gas is conducted through conduit 19. The solids are fed through conduit 18 into the suspension-type exchanger 12 and are mixed therein with the gas which leaves the reactor system at 750° C. The resulting suspension is at 390° C and at this temperature is fed through conduit 13 into the separator 14, from which solids are fed through conduit 3 to the fluidized-bed reactor 1. Owing to the ignition loss, the amount of solids is about 18.7 metric tons per hours.

Additional ore as specified above is directly fed into the fluidized-bed reactor 1 at a rate of 5.8 metric tons per hour.

The fluidized-bed reactor 1 is fed with fluidizing air through the gas-distributor bottom at a rate of 1223 standard m$^3$/h, with secondary air at a rate of 3527 standard m$^3$/h and through conduit 5 with heavy fuel oil at a rate of 421 kg/h. The fluidizing air and the secondary air are preheated to 200° C in the fluidized-bed cooler 30. The combustion is carried out in two stages and with an overall deficiency of oxygen and results in a temperature of 750° C and in the formation of a reducing gas, in which the ratio $CO/(CO+CO_2)$ = 0.2.

The density of the suspension is about 400 kg/m$^3$ in the region between the gas-distributor bottom and the secondary-air inlet 4 and about 30 kg/m$^3$ above the secondary-air inlet 4. The resulting gas velocity in this case is about 6.3 m/sec., based on the empty reactor.

The solids entrained by the gases out of the fluidized-bed reactor 1 are separated in the upper portion of the holding reactor 6 and are collected in its lower portion. The holding reactor 6 is supplied with unpreheated fluidizing air at a rate of 140 standard m$^3$/h and is additionally heated by a supply of fuel oil through conduit 10 at a rate of 15 kg/h.

At a rate of 17.66 metric tons per hour, magnetite at 750° C is discharged through discharge means 9 and is fed through conduit 23 and cyclone 24 into the fluidized-bed cooler 30, in which a reoxidation of the magnetite must be prevented. Fluidizing air at a rate of 3527 standard m$^3$/h is supplied to the fluidized-bed cooler 30 and is heated therein to an end temperature of 200° C.

Air is conducted through the cooling register at a rate of 1223 standard m³/h and is heated therein also to 200° C. The cooling register 35 is used for a cooling with water and generation of steam. The magnetite is discharged through 25 at a temperature of 200° C.

Cold air at a rate of 1060 standard m³/h is supplied through conduit 36 and admixed with the reducing exhaust gas from the holding system to effect an afterburning in that gas. By this afterburning, the added air is heated to 750° C so that the resulting mixture is at the same temperature as the gas in reactors 1 and 6.

The total residence time in the reactor system 1/6 is 0.5 hour and is shared by the fluidized-bed reactor 1 and the holding reactor 6 in a proportion of 1:5.

The magnetite produced has the following particle-size distribution:

100% > 100 μm
52% > 62.5 μm.

We claim:

1. In a method of carrying out an endothermic process involving a solid other than the thermal decomposition of aluminum chloride hydrate followed by calcination, wherein solids capable of endothermic reaction are treated in a fast fluidized-bed reactor supplied with secondary air introduced by an inlet at a level above a gas distributor, particles of the solids are entrained from the bed in a gas stream, and said particles are separated from the gas stream and are at least in part returned to the fast fluidized-bed reactor, the improvement which comprises:

(a) introducing the gas stream together with the entrained particles from said fast fluidized-bed reactor into a holding reactor for separation in an upper position thereof;

(b) fluidizing the separated particles in said holding reactor in a bed with a fluidizing gas introduced into said holding reactor at a velocity such that the solids occupy at least 35% of the volume of the bed of said holding reactor;

(c) feeding particles from an overflow point of a lower portion of said holding reactor via a descending passage into said fast fluidized-bed reactor in a recirculation cycle at a rate sufficient to maintain a predetermined density of solids in said fast fluidized-bed reactor, said predetermined density of the solids in said fast fluidized-bed reactor corresponding to a solids volume of 2 to 20% of the volume of said fast fluidized-bed reactor between said gas distributor and said level and to a solids volume of 0.2 to 2% of the volume of said fast fluidized-bed reactor above the secondary-air inlet;

(d) withdrawing particles from the cycle formed by said fluidized-bed reactor and said holding reactor in a partial stream;

(e) maintaining the particles in said holding reactor for a residence time in excess of the residence time of the solids in said fast fluidized-bed reactor; and (f) maintaining a substantially constant temperature in both said reactors by regulating the rate at which particles are fed in step (c) from said holding reactor to said fast fliuidized-bed reactor, said rate being regulated by varying the flow cross section of said passage between said overflow point and a low point of said fluidized-bed reactor.

2. The improvement defined in claim 1 wherein the pressure drop in said fast-fluidized-bed reactor is maintained substantially constant.

3. The improvement defined in claim 1 wherein the mean residence time of the solids in said fast-fluidized-bed reactor is 10 to 30 minutes.

4. The improvement defined in claim 3 wherein the mean residence time of the particles in said holding reactor is 2 to 10 times the mean residence time of the solids in said fast fluidized-bed reactor.

5. The improvement defined in claim 1 wherein secondary air is introduced into said fast fluidized-bed reactor at a level of about 10 to 30% of the height of said fast fluidized-bed reactor.

6. The improvement defined in claim 5 wherein the ratio of the rate at which secondary air is supplied to said fast fluidized-bed reactor to the rate at which fluidizing gas is supplied thereto is between 10:1 and 1:1.

7. The improvement defined in claim 1, further comprising the step of heating said holding reactor.

8. The improvement defined in claim 1 further comprising treating solids in a heat-transfer relationship with combined exhaust gases from said reactors prior to introducing said solids as fresh solids to said fast fluidized-bed reactor.

9. The improvement defined in claim 8 wherein a further quantity of fresh solids is fed to said fast fluidized-bed reactor directly without treatment with gases withdrawn from said reactors.

10. The improvement defined in claim 1, further comprising the step of cooling the particles withdrawn from said holding reactor in said partial stream in a fluidized-bed cooler having a cooling register.

11. The improvement defined in claim 10 wherein said fluidized-bed cooler is provided with a cooling register, further comprising the step of heating said fluidizing air for said fast fluidized-bed reactor in said cooling register and feeding the heated fluidizing gas of said fluidized-bed cooler as secondary air into said fast fluidized-bed reactor.

* * * * *